Jan. 13, 1925.

G. MORGAN

TRANSMISSION DEVICE

Filed Jan. 12, 1923

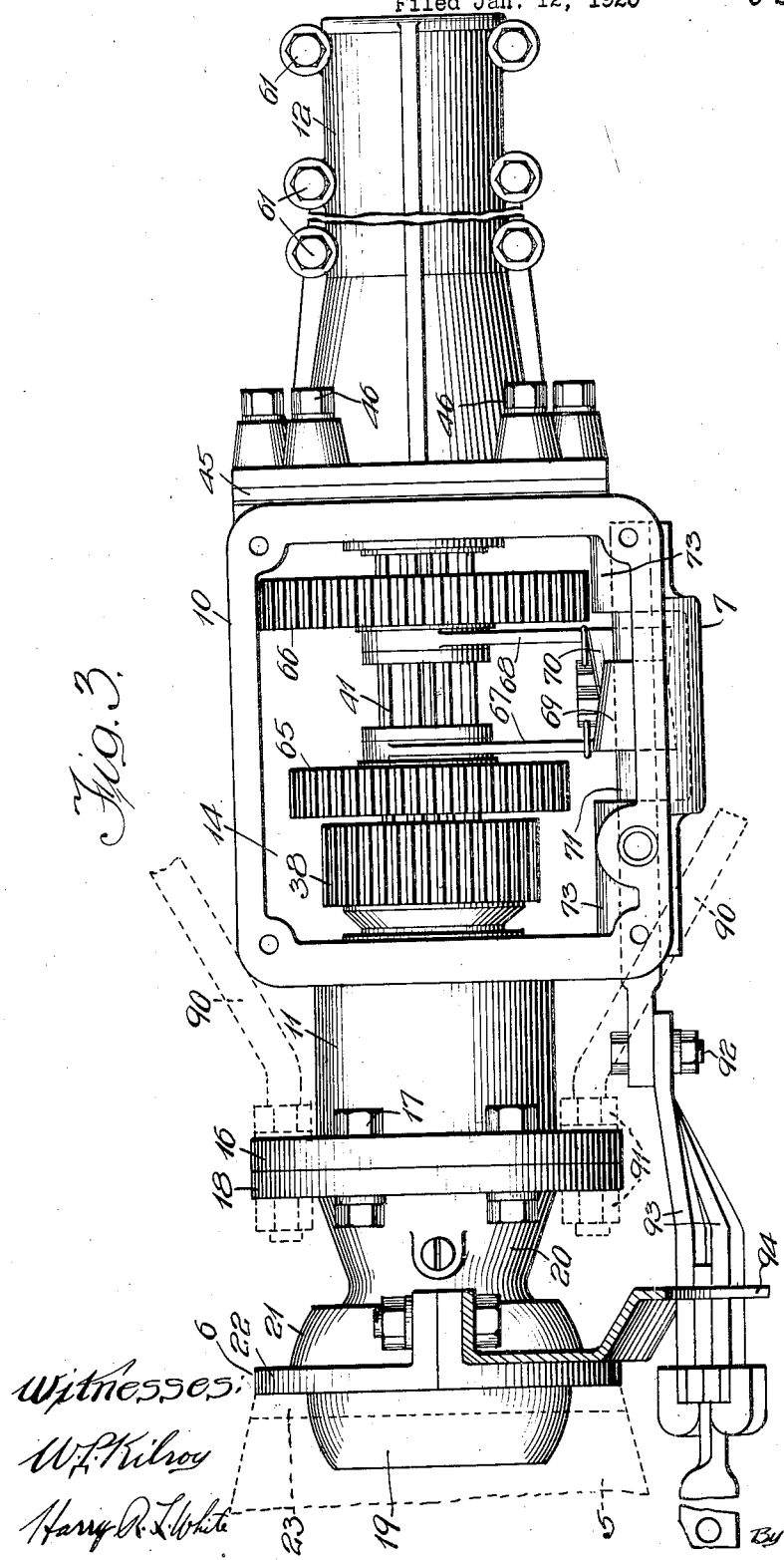

Patented Jan. 13, 1925.

1,522,590

UNITED STATES PATENT OFFICE.

GUY MORGAN, OF NEW YORK, N. Y., ASSIGNOR TO THE WARFORD CORPORATION, OF NEW YORK, N. Y., A CORPORATION OF NEW YORK.

TRANSMISSION DEVICE.

Application filed January 12, 1923. Serial No. 612,348.

*To all whom it may concern:*

Be it known that I, GUY MORGAN, a citizen of the United States, residing at New York city, in the county of New York and State of New York, have invented a certain new and useful Improvement in Transmission Devices, of which the following is a full, clear, concise, and exact description, reference being had to the accompanying drawings, forming a part of this specification.

My invention relates to improvements in auxiliary transmission or change speed devices for use with the ordinary transmissions employed on motor vehicles and the like.

As pointed out in my co-pending application Serial Number 588,744 filed Sept. 18, 1922, certain automobile manufacturers have found it advantageous in facilitating output, reducing the cost of manufacture and simplifying the manipulation of the change speed gearing so that a novice may drive the car, to produce motor vehicles having only two speeds forward and one reverse. The speed changes of transmissions employed in motor boats have also frequently been limited to the same end. In my above referred to application I provide an auxiliary transmission for securing higher and lower speeds than possible with the original or main transmission and intermediate speeds therebetween.

It is an object of my present invention to increase the flexibility in a system employing an auxiliary transmission in conjunction with the original or main transmission and to provide an improved bearing alignment and an arrangement in which the shafts of and connections between the main and auxiliary transmissions will readily adjust themselves to any wear in the bearings of the two devices.

A more specific object is the provision of an improved construction, assembly and arrangement to the above end.

Another object is to position the auxiliary transmission as remote as practically possible from the shocks, jolts and jars at the front and rear wheels of the vehicle so as to eliminate as much as possible binding of and the running shocks from the auxiliary transmission.

A further object is to afford flexibility with lightness and simplicity of design and to improve the balance of the driving system.

A further object is the provision of a device of simple and compact construction which will be positive in operation, conveniently accessible and easily assembled.

A still further object is the provision of a conveniently accessible controlling arrangement in spite of the rearward arrangement of the auxiliary transmission.

In order to acquaint those skilled in the art with the manner of constructing and practicing the invention, I shall now describe, in connection with the accompanying drawings a specific embodiment of the same.

In the drawings:

Fig. 3 is a top plan view with the cover removed; and, Fig. 4 is a section on line 4—4 of Fig. 3 with the forward end of the propeller tube in place in the rearwardly projecting tubular extension of the auxiliary transmission casing.

Figure 1:
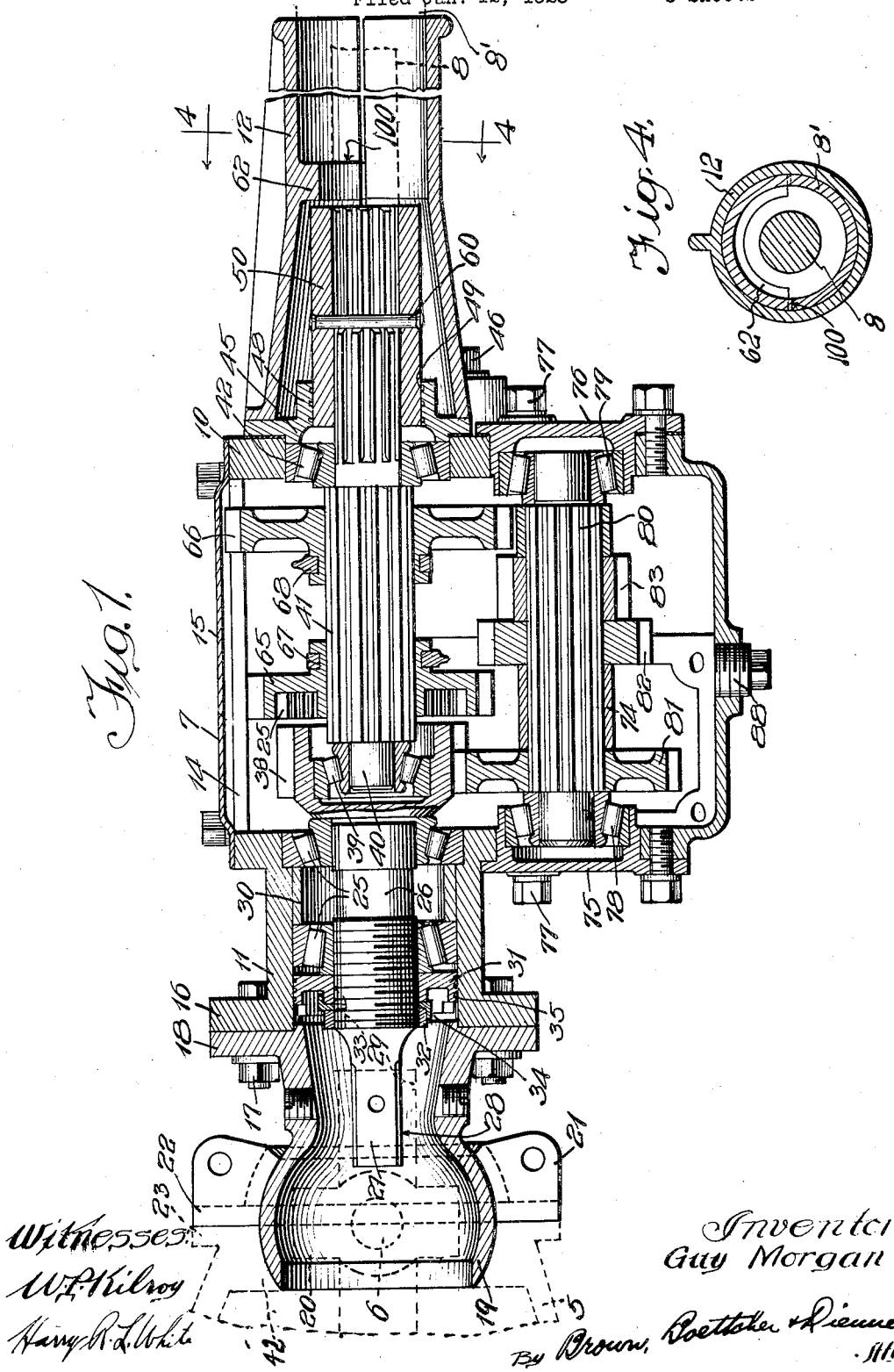
Figure 1 is a vertical longitudinal sectional view of a transmission device embodying my present invention as applied to a motor vehicle of the "Ford" type.
Figure 2:
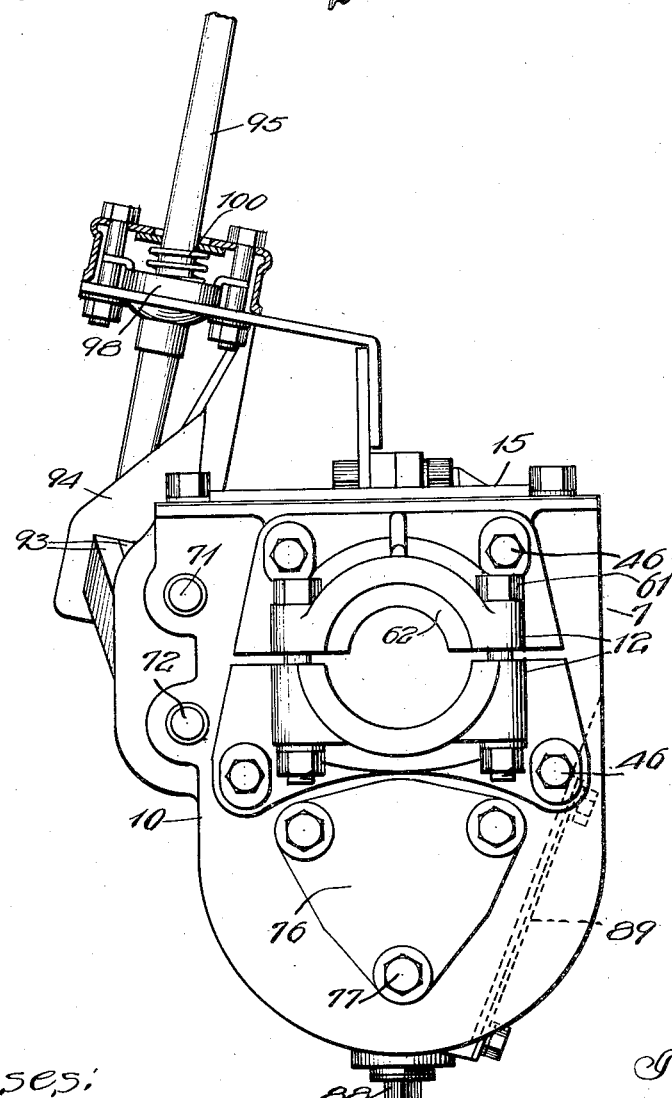
Fig. 2 is an end view of the same.

In the embodiment selected for illustration, 5 designates the main or original transmission casing adopted in the "Ford" type of motor vehicle. To the rear of the transmission enclosed by the casing 5, which transmission is susceptible of only two speeds forward and one reverse, and in its usual position, is the universal joint 6.

The auxiliary transmission device of my present invention designated as a whole by the reference character 7 is mounted to the rear of the universal joint 6 between said universal joint 6 and the forward end of the propeller shaft 8 which is cut off or shortened sufficiently to permit such arrangement of the auxiliary transmission.

The casing 10 of the device 7 is provided with an integral tubular extension 11 projecting forwardly from the front wall thereof and a coaxial tubular extension 12 clamped to the rear wall of the casing 10 by bolts 46 and projecting rearwardly therefrom, and an open top 14 provided with a cover 15. The forward end of the forwardly projecting tubular extension 11 terminates in a flange 16 which flange is clamped by bolts 17 to the flange 18 at the rear end of a member 20, the forward end of which member is bulged out at 19 to provide a socket portion which partially encases the universal joint 6. A two-piece ring 21 clamped about the bulged socket portion 19 of the member 20 is provided with a flange 22 which is adapted to be bolted or otherwise clamped to the flange 23 to the rear of the planetary transmission casing 5.

Rotatably mounted in bearings 25, 25 in the tubular extension 11 is a stub shaft 26, the forward end of which projects from the tubular extension 11 and terminates in a reduced angular stud 27, which in applying the device of my invention, is inserted into an angular socket 28 in the rearwardly projecting universal joint stud 29. The outer race of the rear bearing 25 is mounted in a counterbore in the inner face of the front wall of the casing 10 and a sleeve 30 is provided for positioning the outer race of the other bearing 25. The inner race of the forward bearing is held in place by a capscrew 31 threaded upon the forward end of stub shaft 26 into the tubular extension 11. A lock nut 32 threaded upon the forward end of shaft 26 together with a spline 33 and retention element 34 holds the parts properly assembled. A spiral groove 35 in the periphery of capscrew 31 provides a tight joint between said screw and the interior of the tubular extension 11 and prevents oil leakage therebetween.

The opposite end of shaft 26 is provided with a shoulder for holding the inner race of the rear bearing 25 in place, and the rear face of a pinion or gear 38 formed integral with the rear end of said shaft 26 is recessed to receive a bearing 39 in which a cylindrical stud 40 projecting from the forward end of a second stud shaft 41 is rotatably mounted. The shaft 41 is rotatably mounted at the opposite end of casing 10 in a bearing 42. The bearing 42 is held in place by a ring 45 clamped between the forward end of the tubular extension 12 and the rear wall of casing 10. The ring 45 is provided with a rearwardly projecting hub 48 having an internal spiral groove 49 providing a tight joint between the ring 45 and internally splined sleeve 50 into the forward end of which sleeve the rearwardly projecting splined end 51 of shaft 41 is inserted into driving engagement. The forward splined end of propeller shaft 8 is inserted into driving engagement with the opposite internally splined end of sleeve 50 and a diametrical pin 60 prevents improper positioning of the adjacent inserted ends of shaft 41 and 8. The tubular extension 12 comprises two supplemental sections clamped together by bolts 61 and the upper section is provided with an internal flange 62 engageable in recessed end of propeller tube 8′ to take up the driving torque between the parts. Pin 60 holds sleeve 50 securely against accidental longitudinal displacement.

Tube 8′ fits in the rear end of extension 12 and the inner end of said tube 8′ is scarfed at 100 so that the upper half of the tube terminates adjacent the rear of flange 62 and the lower half of the tube projects forwardly beneath and cooperates with flange 62, which flange, by its cooperation with the lower projecting half of the tube, prevents rotation of the tube under the action of the torque and driving stresses and takes up the torque between the parts.

Splined upon the shaft 41 for longitudinal movement therealong are two gears 65 and 66 of different sizes. These gears are adapted to be independently shifted by shifting members 67 and 68 which engage in circumferential grooves in the projecting hubs of the respective gears and are carried by hub portions 69 and 70 respectively which hub portions are clamped upon longitudinally shiftable shafts 71 and 72 mounted for shifting movement in bosses 73 formed integral with the casing 10.

The casing 10 is provided with coaxial openings in which removable plugs 75 and 76 are secured by bolts 77. The inner ends of the plugs 75 and 76 are recessed to receive bearings 78 and 79 respectively, in which bearings the opposite ends of a countershaft 80 are rotatably mounted. Splined, feathered or otherwise fixed upon the countershaft 80 are a gear 81 which is adapted to permanently engage the pinion or gear 38 and a pair of gears 82 and 83 of different sizes for engagement with the gears 65 and 66 respectively as the same are shifted into mesh therewith. The gears 81 and 82 are properly spaced by a sleeve 74. The gear 65 in addition to being formed for engagement with the spur gear 82 is recessed and provided with a clutch member 25 adapted for co-operation with the spur gear 38 to connect the stub shafts 26 and 41 for rotation together.

The casing 10 which preferably carries a suitable oil or other lubricant from which the bearings and other parts are lubricated is provided with a drain cock 88. The countershaft enclosing portion of the casing is provided with an access opening having a cover 89.

The forward extending ends of the diagonal struts or rear axle brace rods 90 are anchored in the clamped-together flanges 16—18 by suitable nuts 91 which secure the rods in place and aid in clamping the flanges 16—18 together. The forward projecting ends of rods 71—72 are pivotally connected by bolts 92 to links or arms 93 supported intermediate their ends by a bracket 94 mounted upon clamping ring 21 and a shifting lever 95 with a knob 96 at its upper end is arranged at the forward ends of arms 93 to be selectively moved into co-operation with said arms and shifted to shift the desired rod 71—72 and desired gear 65—66. The shifting lever may be of any preferred or suitable type, the particular one shown being fulcrumed at 98 upon a bracket member 99, a spring 100 holding the lever against undue vibration, jarring and the like.

I do not intend to be limited to all of the details of the particular embodiment shown and described.

I claim:

1. In combination, a propeller shaft, a transmission device connected to one end of said propeller shaft, said transmission having a shaft and a sleeve member telescoping over the adjacent ends of said transmission shaft and said propeller shaft and drivingly engaged with said shafts to connect the same for rotation together.

2. In a transmission device, a casing, a projecting driving member, a tubular extension enclosing said driving member and a ring clamped between the casing and said tubular extension, and having fluid tight engagement with said driving member.

3. In a transmission device, a casing, a projecting driving member, a tubular extension enclosing said driving member, and a ring clamped between the casing and said tubular extension and having fluid tight engagement with said driving member, said tubular extension having means for taking up the driving torque between said parts.

4. In a transmission device, a casing, a driving member, a tubular extension enclosing said driving member, and means clamped between the casing and said tubular extension and having fluid tight cooperation with said driving member.

5. In a transmission device, a casing, a tubular extension projecting therefrom, a driving member, tubular means enclosing said driving member and entering said tubular extension, and means in said tubular extension for taking up the driving torque and preventing rotation of said tubular enclosing means.

6. In a transmission device, a casing, a tubular extension projecting therefrom, a propeller shaft entering said tubular extension for driving connection with the transmission, a tube enclosing said propeller shaft, said tube having a scarfed end entering the tubular extension, and means in said tubular extension cooperating with the scarfed end of said tube to take up the torque and prevent rotation of the tube.

7. In combination, a main transmission, an auxiliary transmission adapted for driving connection therewith, and means for flexibly supporting the auxiliary transmission on the main transmission independently of the driving connection therebetween.

8. The combination with a motor vehicle having a main transmission, a drive axle, and driving connection therebetween, of an auxiliary transmission interposed in said driving connection and having flexible support independently of the driving connection between the axle and the main transmission and independent of the axle.

9. In a motor vehicle, the combination with a main transmission and an auxiliary transmission of means for flexibly supporting said auxiliary transmission adjacent the main transmission, said means comprising a tubular coupling secured at one end to the auxiliary transmission, a spherical head at the opposite end of the coupling seated for universal action on the main transmission, and means for holding said head in place.

10. In a motor vehicle, the combination, with a main transmission and an auxiliary transmission of means for flexibly supporting said auxiliary transmission adjacent the main transmission, said means comprising a tubular coupling secured at one end to the auxiliary transmission, a spherical head at the opposite end of the coupling seated for universal action on the main transmission, and means for holding said head in place, said means comprising a clamp contractible circumferentially about the spherical head and means for securing said clamp to the main transmission.

11. In a motor vehicle, the combination with a main transmission having a casing and an auxiliary transmission having a casing of means for flexibly supporting said auxiliary transmission adjacent the main transmission, said means comprising a coupling rigidly secured at its rear end to the auxiliary transmission casing and seated for universal action at its forward end on the main transmission casing.

12. In a motor vehicle having a variable ratio transmission provided with a casing, the combination of an auxiliary transmission mounted adjacent said first transmission and provided with a casing, a coupling member secured at one end to the forward end of the auxiliary transmission casing and terminating at its opposite end in a head swiveled for universal action in a recess in a wall on said first transmission casing, and means for holding the headed end of said coupling member for universal action in said recess to flexibly support the auxiliary transmission on said first transmission.

13. In a motor vehicle having a variable ratio transmission provided with a casing, the combination of an auxiliary transmission mounted adjacent said first transmission and provided with a casing, a forward wall on the auxiliary transmission casing, a tubular projection extending from said wall and forming a journal for a shaft, said tubular projection having at its free end a flange, a driving connection between said auxiliary transmission and said first transmission, said driving connection having a universal joint therein, a sleeve encasing said driving connection and having a flange at one end secured to the flange on said tubular projection, the opposite end of said sleeve terminating in a hollow spherical head surrounding the universal joint in the driving connection between the transmissions and seated for universal action in a recess in a wall on the first transmission, a clamp contractible circumferentially about said spherical head, and means for securing said clamp to the casing of the first transmission to hold said spherical head for universal action in said recess.

14. In a motor vehicle, the combination with a main transmission having a casing and an auxiliary transmission having a casing, of means extending from the auxiliary transmission and seated for universal action on the main transmission for flexibly supporting the auxiliary transmission thereon.

15. In a motor vehicle, the combination of a main transmission device, an auxiliary transmission device, a driving connection therebetween, and tubular means extending from one of said devices and encasing said driving connection, said means being seated for universal action on the other device to flexibly support one transmission device on the other.

16. In combination, a main transmission device, an auxiliary transmission device, a driving connection therebetween, and means extending from one of said devices and seated for universal action on the other to flexibly support one of said transmissions on the other independently of the driving connection therebetween.

17. In a motor vehicle having a main transmission provided with a casing, the combination of an auxiliary transmission mounted adjacent said main transmission and provided with a casing, means extending from the auxiliary transmission and having a head swiveled for universal action in a recess on said first transmission, and means for holding the head of said means for universal action in said recess to flexibly support the auxiliary transmission on said main transmission.

In witness whereof, I hereunto subscribe my name this 7 day of December, 1922.

GUY MORGAN.